United States Patent [19]

Wilhelm

[11] 4,158,696
[45] Jun. 19, 1979

[54] AIR CUSHION RESTRAINT INFLATOR ASSEMBLY

[75] Inventor: Raymond L. Wilhelm, Phoenix, Ariz.

[73] Assignee: Talley Industries of Arizona, Inc., Mesa, Ariz.

[21] Appl. No.: 837,584

[22] Filed: Sep. 28, 1977

[51] Int. Cl.² .................... B01J 7/00; B60R 21/08
[52] U.S. Cl. .................................. 422/166; 102/39; 280/736; 422/167
[58] Field of Search ................... 23/281; 102/39; 280/736; 422/166, 167

[56] References Cited

U.S. PATENT DOCUMENTS

| | | | |
|---|---|---|---|
| 2,889,210 | 6/1959 | Bovard | 23/281 |
| 3,580,250 | 5/1971 | Oroza | 23/281 X |
| 3,647,393 | 3/1972 | Leising et al. | 280/736 |
| 3,715,131 | 2/1973 | Hurley et al. | 23/281 X |
| 3,773,351 | 11/1973 | Catanzarite | 23/281 X |
| 3,861,880 | 1/1975 | Thompson | 23/281 |
| 3,871,684 | 3/1975 | Staudacher et al. | 23/281 X |
| 3,877,882 | 4/1975 | Lette et al. | 23/281 |
| 3,880,447 | 4/1975 | Thorn et al. | 102/39 X |
| 3,904,221 | 9/1975 | Shiki et al. | 23/281 X |
| 3,912,458 | 10/1975 | Fukuma | 23/281 |
| 3,934,984 | 1/1976 | Marlow et al. | 23/281 |
| 3,958,949 | 5/1976 | Plantif et al. | 23/281 |
| 3,972,545 | 8/1976 | Kirchoff et al. | 280/736 X |
| 3,986,456 | 10/1976 | Doin et al. | 102/39 |
| 4,012,211 | 3/1977 | Goetz | 23/281 X |
| 4,013,010 | 3/1977 | Schneiter et al. | 23/281 X |
| 4,066,415 | 1/1978 | Kasama et al. | 102/39 X |

FOREIGN PATENT DOCUMENTS 2541724   4/1976  Fed. Rep. of Germany ............. 23/281

*Primary Examiner*—Barry S. Richman
*Attorney, Agent, or Firm*—Pennie & Edmonds

[57] ABSTRACT

A gas generating device is disclosed which includes a substantially cylindrical outer sleeve defining groups of gas exit ports and a substantially cylindrical inner sleeve for containing a reactable gas-generating material defining groups of gas entrance ports with the inner sleeve being mounted generally coaxial to the outer sleeve. Annular side walls define a plurality of alternating first and second filter chambers in the annular space between the inner and outer sleeves. The first filter chambers are defined by adjacent pairs of annular side walls having a group of gas entrance ports therebetween and contain first filter means. The second filter chambers are defined by adjacent pairs of annular side walls having a group of gas exit ports therebetween and contain second filter means. The second filter chambers communicate with the first filter chambers by means of openings in the annular side walls. Means are provided for initiating reaction of the reactable gas generating material. The gas entrance ports and gas exit ports are so interleaved so as to permit the gas and particulate flow generated within the inner sleeve to follow azimuthal paths of substantially equal length from the entrance ports to the exit ports.

10 Claims, 6 Drawing Figures

AIR CUSHION RESTRAINT INFLATOR ASSEMBLY

BACKGROUND OF THE INVENTION

This invention relates generally to devices capable of generating substantial volumes of gas within a very brief time span, generally a few milliseconds. Gas generators of this type are used to inflate air cushion restraints of the type used in passive vehicle restraint systems designed to insulate vehicle passengers from the harmful secondary impact effects of rapid deceleration caused by vehicle collisions. One technique for inflating air cushion restraints is to connect a reservoir of gas in a cylinder under very high pressure to the air cushion restraint. Upon receipt of a signal from a crash impact sensing device an explosively actuated valve opens, releasing the gas from the cylinder. However, in order to obtain a sufficient volume of gas [approximately 10 cubic feet] for inflating the cushion restraint a relatively large reservoir of gas at pressures of 3,000 psi or more is required. The size of such a container creates difficult engineering problems, with regard to cylinder location, safety and vehicle balance requirements. The compressed gas cylinder technique for inflating air cushion restraints suffers from the additional disadvantage in that pressure is maximum at the commencement of the deployment of the air cushion and decreases as a function of time as the gas in the cylinder is depleted. Further, a minor leak in the cylinder can result in loss of substantial amounts of gas by accidental discharge during the long period that the restraint system must remain in the vehicle. The pressurized gas technique also results in substantial cooling of the gas as it expands thus reducing the effective available volume of gas. This requires a total storage volume significantly greater than if the gases were at an elevated temperature and further adds to the above-discussed automotive engineering problems.

Another technique for generating gas within the requisite short period of time is the use of pyrotechnic charges to inflate air cushion restraints. In such a device the inflating gas is generated by the rapid reaction of the charge reactants upon receipt of a signal from an impact sensing device. While pyrotechnic devices eliminate the problems heretofore discussed which are associated with compressed air systems, the results of the required exothermic reaction, heat and by-products, must be controlled within acceptable limits for safe use. The gases inflating the air cushion restraint must not have chemical or thermal characteristics which will undermine the mechanical strength of the cushion restraint itself or injure the passenger in the case of a cushion restraint rupture. Therefore the generated gas flow, which includes a gas phase as well as a particular phase, must be cooled and filtered within the generator before it enters into the air cushion restraint. In addition, automobile manufacturers have further required that such gas generating units must be nonpropulsive, that is, the gas escaping through the gas exit ports into the restraint cushion must exert a net reactive force of approximately zero, to preclude what would otherwise be a dangerous condition in the event the generator becomes detached from its mounting. In devices of this type the use of mechanical filters utilizing fine screen to filter and cool the gas prior to its exit from the gas generator has been shown to be most effective. However, certain known devices using such mechanical filters and conforming to the nonpropulsive requirement have heretofore been provided with a filter covering the gas exit ports of the combustor chamber that is radially and axially continuous from end to end. This is very inefficient as it requires the use of a large amount of expensive screen material. Further, such a construction prevents the use of interchangeable filter components which may be mass produced and assembled by relatively unskilled personnel thereby further increasing the cost of each inflator unit. One such device comforming to the nonpropulsive requirement is in the form of concentrically mounted cylinders, with the outer cylinder having gas exit ports for directing flow into an inflatable bag. The gas exit port configuration is necessarily limited to two rows of such ports each being on an opposite side of the cylinder. Efficient operation of an inflator having such a gas exit port configuration requires that the gas entrance ports of the inner cylinder, which functions as the combustion chamber, also be limited to two rows each being on an opposite side of the inner cylinder. The rows are interleaved with and separate from the gas exit holes in the outer cylinder. This configuration requires a filter which is radially and axially continuous to compensate for possible mechanical stress on the filter means resulting from such a gas entrance and exit port configuration. If a continuous screen filter is not used in conjunction with the above structure it is difficult to seal the system adequately to prevent unwanted by-products of the exothermic gas producing reaction from bypassing the filter and reaching the restraint cushion. Also, a noncontinuous filter would be prone to displacement possibly resulting in a pressure drop across the gas exit ports hampering proper cushion deployment.

SUMMARY OF THE INVENTION

The present invention relates to a gas generating device in which the filter means and the housing cooperate to provide the stability required for preventing filter screen displacement, permitting the use of significantly less screening material and resulting in substantial reduction of the production cost of each unit with no loss of efficiency.

The air cushion restraint inflator assembly of the present invention comprises an elongated substantially cylindrical outer sleeve having a plurality of openings therein defining gas exit ports. The openings are divided into a plurality of narrow bands of openings separated from one another in an axial direction along the length of the outer sleeve by portions of the outer sleeve which do not define openings. Each narrow band includes a plurality of openings spaced apart circumferentially about the outer sleeve.

An elongated substantially cylindrical inner sleeve for containing a reactable gas generating material is mounted generally coaxial to the outer sleeve and defines an annular region therebetween. The inner sleeve has a plurality of openings defining first filter chamber gas entrance ports which are segregated into a plurality of narrow bands of gas entrance ports. The bands of gas entrance ports are separated from one another in an axial direction by portions of the inner sleeve which do not define openings. The bands of gas entrance ports are interleaved with and separated from the bands of gas exit ports in an axial direction. Each band includes a plurality of gas entrance ports spaced apart circumferentially about the inner cylindrical sleeve. The invention further includes means for initiating reaction of the reactable gas generating material.

A plurality of annular side walls extend between the inner and outer sleeves and are separated from one another in an axial direction. The side walls segment the annular region into a plurality of filter chambers, each annular side wall being positioned between a group of gas exit ports and a group of gas entrance ports. Alternating first annular filter chambers are defined by adjacent pairs of annular side walls which have a group of gas entrance ports therebetween with each first chamber including a first filter means. Alternating second annular filter chambers are defined by adjacent pairs of annular side walls which have a group of gas exit ports therebetween with each second chamber including a second filter means. The second filter chambers communicate with the first filter chambers by means of annular side wall openings. In accordance with the invention the outer sleeve gas exit ports are so interleaved with the inner sleeve gas entrance ports as to permit the gas and particulate flow generated within the inner sleeve to follow azimuthal paths of substantially equal length from the gas entrance ports through the first and second annular filter chambers and out of the gas exit ports without bypassing the filter means.

DETAILED DESCRIPTION OF THE PREFERRED EMBODIMENTS

Figure 1A:
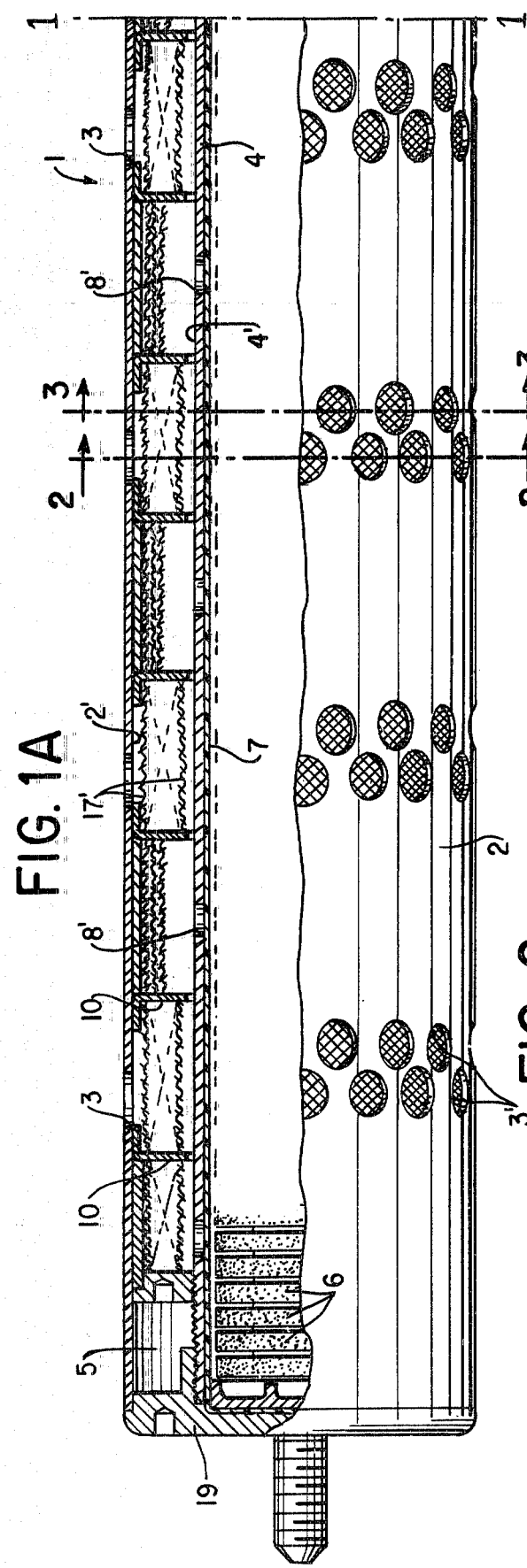
FIG. 1 (comprised of FIG. 1A and FIG. 1B, broken along lines 1—1) is a side view shown partly in section of the air cushion restraint inflator assembly of the present invention.
Figure 3:
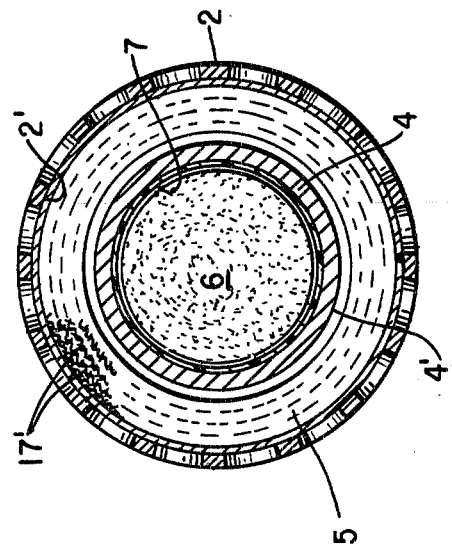
FIG. 3 is a cross-sectional view of the air cushion restraint inflator assembly taken along lines 3—3 of FIG. 1.
Figure 2:
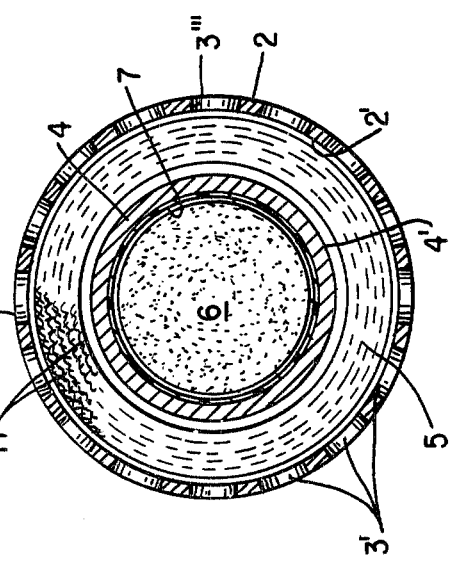
FIG. 2 is a cross-sectional view of the air cushion restraint inflator assembly taken along lines 2—2 of FIG. 1.
Figure 1B:
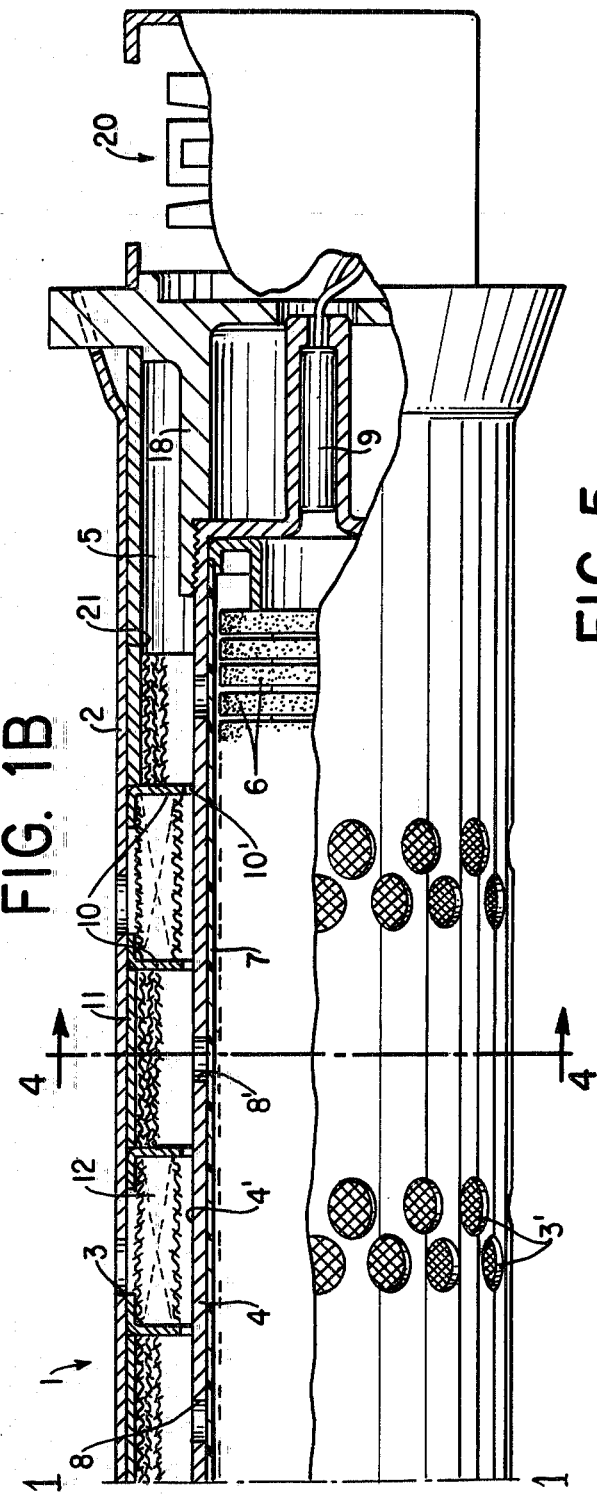
Figure 4:
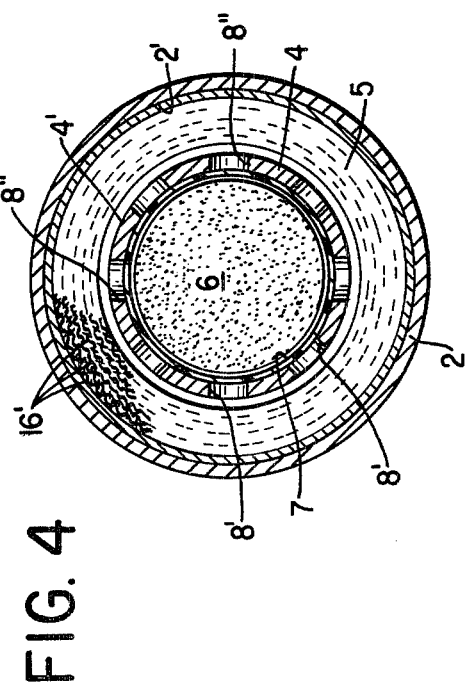
FIG. 4 is a cross-sectional view of the air cushion restraint inflator assembly taken along lines 4—4 of FIG. 1.

The air cushion restraint inflator assembly 1 as shown in FIG. 1 includes an elongated generally cylindrical outer sleeve 2 having a plurality of gas exit ports 3. The exit ports 3 are divided into a plurality of groups of exit ports 3', separated from one another in an axial direction along substantially the entire length of the outer sleeve 2. As shown in FIGS. 1, 2 and 3, each group includes multiple rows of openings. Each group 3' of openings extends about the circumference of the outer sleeve in a narrow band. An elongated cylindrical inner sleeve 4 is mounted coaxial to the outer sleeve with the inner surface 2' of the outer cylinder and the outer surface 4' of the inner cylinder, defining an annular space 5 therebetween. The inner sleeve 4 contains a reactable gas generating material in the form of a plurality of propellant wafers 6. The propellant is pressed into wafers to prevent the burning of significant amounts of propellant outside the combustion chamber, to give a more constant gas generation rate and to prevent shifting of the propellant. Each wafer 6 is configured in a manner to allow space for propellant powder to be uniformally placed between the wafers, assuring a continuous propellant phase. This ensures near instantaneous ignition of all wafers, end to end, and cushions each wafer from shock and vibration. The wafers may be enclosed in a hermetically sealed cartridge 7 made of a frangible material such as a polyamide film or a phenolic impregnated paper tube. The cylindrical inner sleeve 4 has a plurality of gas entrance ports 8 which are segregated into a plurality of groups of entrance ports 8' separated from one another in an axial direction and extending around the entire circumference of the inner sleeve as shown in FIG. 4. Each group of gas entrance ports 8' is interleaved with and separated from the groups of gas exit ports 3' in an axial direction. Means are located within the inner sleeve for initiating reaction of the gas generating wafers. This initiating means is in the form of a squib 9 projecting into the inner sleeve 4. The squib is responsive to intertial actuators (not shown) which detect rapid changes in vehicle velocity. Igniter end closure cap 18 and closure cap 19 are secured to the inner and outer sleeves and index the annular space 5. The igniter end closure cap houses the squib 9 which is connected to the actuator by means of connector 20.

The annular space 5 is provided with a plurality of annular side walls 10. Each annular side wall has an opening 10', positioned near the outer surface 4' of inner sleeve 4. The walls are separated from one another in an axial direction and segment the annular region into a plurality of filter chambers effectively sealing each filter chamber from the other and preventing unwanted by-products from entering the restraint cushion. A first annular filter chamber 11 is defined by adjacent pairs of annular side walls 10 which have a group of gas entrance ports 8' therebetween and a second annular filter chamber 12 is defined by adjacent pairs of annular side walls 10 which have a group of gas exit ports 3' therebetween. The first annular filter chamber 11 communicates with the second annular filter chamber 12 by means of the openings 10'. The side walls 10 are axially loaded against the outer sleeve 11' of the first filter 11 to affect a seal which prevents unwanted by-products from bypassing the second filter and entering the restraint cushion.

Figure 5:
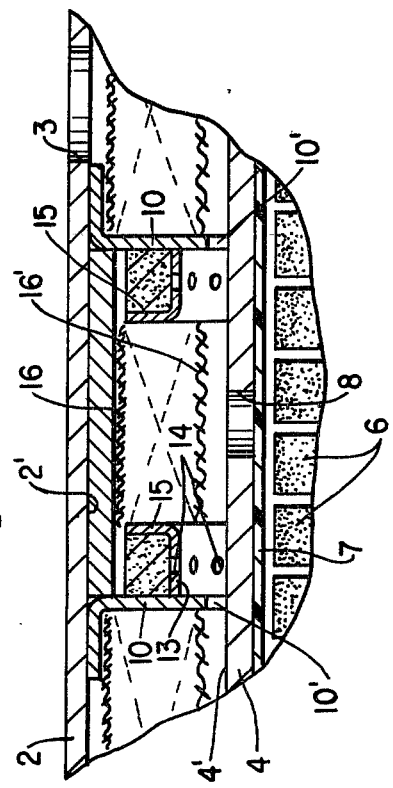
FIG. 5 is a cross-sectional view of an alternate embodiment of the first filter chamber.

If chemical agents such as adipic acid and aluminum sulfate octadecahydrate are to be used to cool and neutralize the gas, they may be placed either in the first filter chamber or the second filter chamber. FIG. 5 illustrates a preferred embodiment wherein a first filter chamber contains chemical agents supplementing the mechanical filter means 16. The filter chamber 11 has an annular shelf 13 upstanding from each of the opposed wall surfaces defining the chamber 11. Each of shelves 13 has a plurality of holes 14 and a radially outwardly directed flanged end portion 15. The first filter means 16 in the form of a plurality of layers of steel mesh screen 16' is mounted within the first filter chamber spaced apart from its associated group of gas entrance ports 8'. This provides a flow path from entrance ports 8 to annular side wall openings 10'. The radially outwardly directed flanged end portions 15 of the shelves 13 provide lateral stability for the filter 16 and the shelves 13 position the chemical agents within the filter chamber 11. As shown in FIG. 1, if the chemical agents are to be placed in the second filter chamber 12 interspersed between screen layers 17' of filter means 17, the first filter chamber 11 will contain only the mechanical filter means 16. Second filter chamber 12 has a filter means 17 comprised of layers of screen 17' having different mesh sizes with the mesh sizes being arranged in order of decreasing mesh size in the direction of gas flow. The screen layers are positioned parallel to the inner sleeve 4 and substantially parallel to the gas flow passing through openings 10' from chamber 11.

The above-described inflator assembly constructed of interchangeable component parts, may be assembled quickly and easily by relatively unskilled personnel. Further, the components may be manufactured individually at the most convenient locations therefore and subsequently assembled, thus assuring that production costs will be kept to a minimum.

In the event of collision, the squib 9 ignites and bursts through a frangible section of the propellant cartridge 7 adjacent to the squib end. The propellant cartridge may be made of a phenolic impregnated paper tube. This ignites the powder optimally distributed between the propellant wafers 6 substantially simultaneously which in turn ignites the propellant wafers 6. The propellant may, for example, be of a composition disclosed in U.S. Pat. No. 3,895,098. The flow, containing a gas phase and a particulate phase, will flow through gas entrance ports 8 and into the first filter chamber 11 substantially perpendicularly to the layers of mesh screen 16'. The major portion of the gas stream flow passes through the first filter 16 with most of the particulate phase, largely molten metal in the case of the propellant of U.S. Pat. No. 3,895,098, being deposited on the mesh screen layers 16'. The remainder of the flow makes a 90° turn and moves in the direction of the annular side wall openings 10'. If the chemical agents are to be located in filter chamber 11, as shown in FIG. 5, the flow makes a plurality of 90° turns after being subjected to the gas cleaning action of the first filter means and passes through the shelf openings 14 after contacting the chemical agents, making a last 90° turn before rejoining the other flow portion. If the chemical agents are to be placed in filter chamber 12, chamber 11 will house filter 16 only and the gas flow, after being subjected to the mechanical filtering process, makes a plurality of turns of at least 90° and rejoins the other flow portion. The entire gas stream passes through the annular side wall openings 10' and enters the second filter chambers 12 contacting the mesh layers 17' of the second filter means 17 normal to the mesh layers. This ensures that the gas flow when it is at its highest velocity after the initial filtering will contact the second filter means at its most stable point. The gas flows through the second filter means 17, depositing any remaining particulate matter onto the mesh screen layers 17', out of the gas exit ports, and into the restraint cushion (not shown). Throughout the first and second filtering phases, displacement of the filter members is inhibited by the annular side walls 10. As shown in FIGS. 2, 3 and 4, the filter system is further stabilized by the interleaving of the gas entrance ports 8 and the gas exit ports 3. For example, a gas flow from gas entrance port 8" shown in FIG. 4 follows a specific path to its associated gas exit ports 3" shown in FIGS. 2 and 3. A gas flow from entrance port 8"', also shown in FIG. 4, to its associated gas exit ports 3"' will follow an azimuthal path of substantially the same length. This reduces stress on the filter screens thereby minimizing filter displacement which would cause a pressure drop across the groups of exit ports 3', possibly interfering with proper cushion deployment.

I claim:

1. An air cushion restraint inflator assembly comprising:
    (a) an elongated substantially cylindrical outer sleeve having a plurality of openings therein defining gas exit ports, the openings being divided into a plurality of narrow bands of openings separated from one another in an axial direction along the length of the outer sleeve by portions of the outer sleeve which do not define openings, each narrow band including a plurality of openings spaced apart circumferentially about the outer sleeve;
    (b) an elongated substantially cylindrical inner sleeve mounted within and in generally coaxial relation to the outer sleeve and for containing a reactable gas-generating material, said inner and outer sleeves defining an annular region therebetween, said inner sleeve having a plurality of openings defining first filter chamber gas entrance ports segregated into a plurality of narrow bands of gas entrance ports, the bands of gas entrance ports being separated from one another in an axial direction by portions of the inner sleeve which do not define openings and interleaved with, and separated from the bands of gas exit ports in an axial direction, each narrow band including a plurality of gas entrance ports spaced circumferentially about the inner cylindrical sleeve;
    (c) means for initiating reaction of the reactable gas generating material; and
    (d) a plurality of annular side walls extending between the inner and outer sleeves and separated from one another in an axial direction to segment the annular region into a plurality of filter chambers, each annular side wall being positioned between a group of gas exit ports and a group of gas entrance ports thereby forming alternating:
        (1) first annular filter chambers defined by adjacent pairs of annular side walls which have a group of gas entrance ports therebetween each first chamber including a first filter means, and
        (2) second annular filter chambers defined by adjacent pairs of annular side walls which have a group of gas exit ports therebetween each second chamber including a second filter means, said second filter chambers communicating with said first filter chambers by means of annular side wall openings.

2. The air cushion restraint inflator assembly according to claim 1 wherein the openings defining second filter chamber gas exit ports are substantially circular.

3. The air cushion restraint inflator assembly according to claim 2 wherein the openings defining first filter chamber gas entrance ports are substantially circular.

4. The air cushion restraint inflator assembly according to claim 3 wherein the annular side wall openings are positioned proximal the inner sleeve and are defined by the radially innermost surfaces of the annular side walls and the corresponding opposing inner sleeve outer wall portion 6.

5. The air cushion restraint inflator assembly according to claim 4 wherein the outer sleeve gas exit ports are so interleaved with the inner sleeve gas entrance ports as to permit the gas and particulate flow generated within the inner sleeve to follow azimuthal paths of substantially equal length from the gas entrance ports, through the first and second annular filter chambers and out of the gas exit ports thereby maintaining the mechanical seal and integrity of the first and second filter means and providing for uniform filtration of the gas and particulate flow.

6. The air cushion restraint assembly according to claim 5 wherein the first filter means is comprised of a plurality of layers of mesh screen mounted radially spaced apart from the gas entrance port and substantially perpendicular to the flow of gas from the gas exit port, with the bottom screen layer of the filter means and the outer surface of the inner sleeve defining a passage from the gas entrance port to the annular side wall openings associated therewith.

7. The air cushion restraint inflator assembly according to claim 6 further comprising an annular shelf upstanding from each of the opposed wall surfaces of the first filter chambers proximal to and outwardly disposed from the annular side wall openings, each of said shelves defining a plurality of holes and having a radially outwardly directed flanged end portion said flanged end portions providing support for filter means disposed therebetween.

8. The air cushion restraint inflator assembly according to claim 7 wherein the second filter means includes a plurality of layers of screens positioned parallel to the inner sleeve with the mesh size of the screen layers decreasing in the direction of gas flow, said filter being mounted within the chamber in such manner that the gas flow entering the second filter chamber contacts the initial filter screen portion edge on and parallel to the screen thereby subjecting the second filter means to high flow stress at its strongest point.

9. The air cushion restraint inflator assembly according to claim 8 further including chemical agents for cooling and neutralizing the gas interspersed between the outer screen layers of the second filter means.

10. The air cushion restraint inflator assembly according to claim 9 wherein the chemical agents include adipic acid and aluminum sulfate octadecahydrate.

* * * * *